(12) United States Patent
Kreckel

(10) Patent No.: US 6,458,454 B1
(45) Date of Patent: Oct. 1, 2002

(54) HOLDING DEVICE

(75) Inventor: Karl W. Kreckel, Haan (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/269,938

(22) PCT Filed: Oct. 1, 1997

(86) PCT No.: PCT/US99/17729

§ 371 (c)(1),
(2), (4) Date: Apr. 6, 1999

(87) PCT Pub. No.: WO98/15602

PCT Pub. Date: Apr. 16, 1998

(30) Foreign Application Priority Data

Oct. 7, 1996 (EP) ............................................. 96116040

(51) Int. Cl.⁷ ............................. B32B 7/12; B32B 25/20
(52) U.S. Cl. ....................... 428/343; 428/340; 428/391; 428/402
(58) Field of Search ................................ 488/343, 340, 488/391, 402

(56) References Cited

U.S. PATENT DOCUMENTS

| | | | |
|---|---|---|---|
| 2,859,198 A | 11/1958 | Sears et al. | |
| 4,163,081 A | 7/1979 | Schulz | |
| 4,181,752 A | 1/1980 | Martens et al. | |
| 4,671,480 A | 6/1987 | Frye | |
| 4,756,498 A | 7/1988 | Frye | |
| 5,118,562 A | 6/1992 | Johnson et al. | |
| 5,409,189 A | 4/1995 | Luhmann | |
| 5,507,464 A | 4/1996 | Hamerski et al. | |

FOREIGN PATENT DOCUMENTS

| | | |
|---|---|---|
| EP | 0 289 962 B1 | 11/1988 |
| EP | 0 349 216 A1 | 1/1990 |
| EP | 0 622 431 A1 | 11/1994 |
| EP | 0 736 585 A1 | 11/1994 |
| WO | WO 91/06782 | 5/1991 |
| WO | WO 94/00052 | 1/1994 |
| WO | WO 96/31559 | 10/1996 |

OTHER PUBLICATIONS

James D. Crowley, G. S. Teague, Jr., and Jack W. Lowe, Jr., "A Three–Dimensional Approach to Solubility", *Journal of Paint Technology*, vol. 38, No. 496, pp. 269–280.

'Physical and Chemical Examination of Paints, Varnishes, Lacquers, and Colors,' *Paint Testing Manuel*, 13$^{th}$ edition, G. G. Sward, Ed., American Society for Testing and Materials, Philadelphia, PA.

Flory, Paul J., *Principles of Polymer Chemistry*, Cornell University Press, Ithaca, New York, 1953, p. 579.

Encyclopedia of Polymer Science and Engineering, 2$^{nd}$ edition, New York, 1988, vol. 4, pp. 355–357.

JP 09 003 413 Sekisui Chem Co Ltd., Jan. 7, 1997, abstract.
JP 08 319 463 Sekisui Chem Co Ltd., Apr. 30, 1997, abstract.
JP 08 319 462 Sekisui Chem Co Ltd., Apr. 30, 1997, abstract.
JP 08 109 356 Sekisui Chem Co Ltd., Aug. 30, 1996, abstract.

*Primary Examiner*—Duc Truong
(74) *Attorney, Agent, or Firm*—Carolyn V. Peters

(57) ABSTRACT

The present invention refers to a holding device which is attachable to a rigid surface comprising an exposed pressure-sensitive adhesive layer wherein the pressure sensitive adhesive is readily removable from the surface and is selected to exhibit a compliance of between $5 \times 10^{-7}$ to $2 \times 10^{-6}$ cm2/dyne, and a toughness of between $5 \times 10^2$ to $2 \times 10^3$ pounds/inch2 and to a corresponding pressure sensitive adhesive. The invention furthermore refers to a kit of parts comprising a holding means and a pressure-sensitive adhesive tape to be attached to said holding means said adhesive tape comprising at least one exposed pressure-sensitive adhesive layer according to claims of the inventions.

11 Claims, No Drawings

HOLDING DEVICE

FIELD OF THE INVENTION

The present invention refers to a removable holding device, such as a wall hook, which bears a pressure-sensitive adhesive layer.

BACKGROUND OF THE INVENTION

Holding devices such as hooks bearing pressure-sensitive adhesive tapes are known, for example, from U.S. Pat. No. 4,671,480 and U.S. Pat. No. 4,756,498. Many pressure-sensitive adhesive materials suggested for such applications either split apart under stress of removal, leaving stubborn residue on the surface which must be removed with the aid of organic solvents and mechanical scraping tools, or they form a permanent bond with the surface. Acrylate based pressure-sensitive adhesive materials having high adhesion strength and quick build-up of adhesion strength which are useful for bonding structural components, are described, for example, in Japanese patent JP 8-109,356.

To overcome these problems, pressure-sensitive adhesive tape holding devices have been developed which allow the adhesive bond to be broken on demand by stretching the adhesive layer in the plane of the adhesive bond. These holding devices which are described, for example, in WO 92/11,333, U.S. Pat. No. 5,507,464 or U.S. Pat. No. 5,409,189 have the advantage that they provide strong bonding to smooth and rigid surfaces and also provide a pressure-sensitive adhesive bond that can be broken at any desired time. The removal mechanism requires, however, that a section of the pressure-sensitive adhesive tape protrude from the bonding plane to aid in grasping and debonding, a feature often undesirable from an aesthetic point of view. Additionally, most of the pressure-sensitive adhesives used are opaque and therefore less suitable for bonding transparent objects.

There was therefore a need for providing a holding device bearing a pressure-sensitive adhesive which is attachable to rigid surfaces whereby the pressure-sensitive adhesive is easily removable from the surface on demand, which holding device does not exhibit the disadvantages of the holding devices described in prior art or exhibits them to lesser degree only.

SUMMARY OF THE INVENTION

The present invention refers to a holding device which is attachable to a smooth and rigid surface comprising a holding means bearing an exposed pressure-sensitive adhesive layer wherein the pressure-sensitive adhesive is obtainable by polymerizing a precursor comprising
 a) a monomer component which contains one or more alkyl acrylates, the alkyl groups of which have an average of 4–14 C atoms, and at least 5 phr of at least one copolymerizable monomer having a polar group,
 b) 5–15 phr of hydrophobic silica,
 c) one or more polymerization initiators, and
 d) one or more crosslinker compounds in a concentration resulting in a crosslink density obtainable by using hexanedioldiacrylate as a reference crosslinker compound in the concentration of between 0.06–0.13 phr,
and exhibits
 a compliance of between $5 \times 10^{-6}$ to $2 \times 10^{-5}$ m²/N ($5 \times 10^{-7}$ to $2 \times 10^{-6}$ cm²/dyne), and
 a toughness of between $2.9 \times 10^3$ to $9.8 \times 10^3$ kg/m² ($6 \times 10^2$ to $2 \times 10^3$ pounds/inch²)

DETAILED DESCRIPTION OF THE INVENTION

The present invention concerns a holding device comprising an exposed pressure-sensitive adhesive layer. The holding device can exhibit various forms and can comprise, for example, one or several pieces.

One-piece constructions such as, for example, one-piece hooks are described, for example, in WO 92/11,333, p. 12, ln. 18 to p. 13, ln. 23.

The holding device can also comprise an anchoring device the front surface of which bearing the pressure-sensitive adhesive layer and the rear surface of which comprising engagement means to engage a cooperative feature of a holder.

An example of a holding device comprising an anchoring device which is designed to releasably engage the rearview mirror of a car, is described in co-pending PCT patent application PCT/US 96/05,416 (see, in particular, FIG. 1 and 2). This anchoring device is commercially available under the trademark GM #5-3823 from SSI Technology, Inc., of Janesville, Wis. Other commercially available mirror buttons include the following non-exclusive list S-3756, S-3823 and S-2525, all available from SSI Technology, Inc., of Janesville, Wis.

Another example of a holding device comprising an anchoring device which is suitable in the present invention is described in EP 0,289,962. This anchoring device has a forwardly protruding nose forming the front surface which carries the pressure-sensitive adhesive layer and a rear surface comprising a recess surrounded by a circular rim which forms a base for removable supporting hooks or the like.

It is also possible that the holding device according to the present invention consists of the pressure-sensitive adhesive layer. The pressure-sensitive adhesive layer according to the invention can be used for mounting objects such as, for example, body side moldings on cars, pictures frames, posters or graphics.

The holding devices described are merely illustrative and it will be recognized that numerous other designs can be used. Holding devices which comprise a holding means of one or more pieces and a pressure-sensitive adhesive layer which is attached to at least one of these pieces, are preferred.

In case of holding devices comprising a holding means, the pressure-sensitive adhesive layer is usually attached to part of the holding means such as, for example, to the rear surface of a one-piece construction type hook or the rear surface of an anchoring device. The thickness of the adhesive layer and its extension in the bonding area are chosen to provide a sufficient holding power for the respective applications.

The pressure-sensitive adhesive layer of the holding device is attached to rigid surfaces.

Examples of rigid surfaces include glass, metal surfaces such as stainless steel and brushed aluminum, wood, painted metal and wood, plastics such as polymethylmethacrylate, polypropylene, melamine-coated chipboard such as that used in countertops, concrete (painted or unpainted) and cinderblock (painted or unpainted). Rigid surfaces which can be bonded, but are somewhat less suitable for use with the holding device of the present invention include wallpaper, sheetrock and such surfaces which delaminate easily after prolonged contact with a strong adhesive bond.

In case of a holding device comprising a holding means, part of the surface of the holding means bears a layer of a pressure-sensitive adhesive which is attached to the rigid surface. The shape of the area of the holding means bearing the pressure-sensitive adhesive is preferably chosen to conform closely to the shape of the area where it is intended to be adhered so that maximum contact and a good adhesive bond will result.

The holding device of the present invention bears a pressure-sensitive adhesive layer selected so that
(i) the pressure-sensitive adhesive layer exhibits a high internal strength,
(ii) the holding device exhibits a high cantilever resistance, and
(iii) the pressure-sensitive adhesive layer can be readily removed from rigid surfaces.

Feature (i) ensures that the pressure-sensitive adhesive does not split apart under the stress of removal or breaks apart in larger adhesive parts only which can be gripped manually.

The cantilever resistance of feature (ii) is defined as ability of the pressure-sensitive adhesive bond to resist failure under forces which occur when, for example, an object is attached to a hook bonded to an essentially vertical surface. The required cantilever resistance depends on the intended application, but it should be high enough to render the holding device suitable for many practical applications such as, for example, mounting a liquid soap dispenser or a dispenser for tissues on ceramic tile walls. Another more demanding application which requires high cantilever resistance is, for example, mounting of wall hooks which are intended to hold heavy and bulky objects such as bathrobes and coats which exert not only great forces in the vertical direction, but also substantial cantilever type forces on the adhesive bond.

Removing the holding device from the rigid surface it had been attached to, can be effected by inserting a lever tool beneath the be hive layer of the holding device and prying it away from the surface. During such operation the holding device including the pressure-sensitive adhesive layer may be completely removed from the surface. In other cases the pressure-sensitive adhesive layer may fully or partly remain on the surface. In these cases the term "readily removable" as used in above feature (iii) means that the pressure-sensitive adhesive can be manually removed from the surface without using chemical agents such as organic solvents or mechanical tools such as knives or scrapers.

It was found that the desired profile of features (i) to (iii) is obtained if the pressure-sensitive adhesive layer exhibits a compliance of between $5\times10^{-6}$ to $2\times10^{-5}$ $m^2/N$ ($5\times10^{-7}$ to $2\times10^{-6}$ $cm^2/dyne$), and a toughness of between $2.9\times10^3$ to $9.8\times10^3$ $kg/m^2$ ($6\times10^2$ to $2\times10^3$ $pounds/inch^2$)

whereby the compliance and the toughness are measured as is indicated below in the section Test Methods.

Compliance, often referred to as creep compliance, is a measure of the ability of a viscoelastic mass to flow slowly under shearing stress and is mainly reflected in the properties of cantilever resistance and adhesion build-up with time. It was found that pressure-sensitive adhesives with a compliance above $2\times10^{-5}$ $m^2/N$ ($2\times10^{-6}$ $cm^2/dyne$) often exhibit a high adhesion buildup over time resulting in formation of a permanent bond.

Pressure-sensitive adhesives with high compliance values of more than $2\times10^{-5}$ $m^2/N$ ($2\times10^{-6}$ $cm^2/dyne$) are often quite soft as well, and when used to adhere wall hook, for example, were found to exhibit cohesive failure of the adhesive mass.

It was furthermore found that pressure-sensitive adhesives with a low compliance of less than $5\times10^{-6}$ $m^2/N$ ($5\times10^7$ $cm^2/dyne$) do not conform well to rigid surfaces and cannot wet such surfaces well.

If the toughness is chosen to be below the window specified above, the pressure-sensitive adhesive could not easily be removed from the surface or was bonded permanently.

If the toughness is chosen to be above the window specified above, the pressure-sensitive adhesive was found not to form a good adhesive bond with the substrate.

Pressure-sensitive adhesives with these properties are new and they are subject matter of the present invention. The compliance is preferably between $7.5\times10^{-6}$ and $1.5\times10^{-5}$ $m^2/N$ ($7.5\times10^{-7}$ and $1.5\times10^{-6}$ $cm^2/dyne$) and more preferably between $1.0\times10^{-5}$ and $1.4\times10^{-5}$ ($1.0\times10^{-6}$ and $1.4\times10^{-6}$ $cm^2/dyne$) $m^2/N$. The toughness is preferably between $2.9\times10^3$ and $9.8\times10^3$ $kg/m^2$ ($6\times10^2$ and $1.5\times10^3$ $pounds/inch^2$) and more preferably between $2.9\times10^3$ and $kg/m^2$($6\times10^2$ and $1.0\times10^3$ $pounds/inch^2$).

Pressure-sensitive adhesives of the present invention are also preferably clear. In the present application, "clear" means optically clear or transparent to slightly translucent. Clear adhesives are preferred so that holding devices of the present invention can be mounted on clear substrates such as glass or polymethyl methacrylate, for example. Clear adhesives also produce aesthetic and appealing bonds involving transparent plastic hooks, for example, on clear substrates. Fillers and additives, when used, should preferably be selected as to maintain clarity of the resulting pressure-sensitive adhesive.

It was found that a specific class of pressure-sensitive adhesives which fulfill the above requirements is obtainable by polymerizing a precursor comprising
a) a monomer component which contains one or more alkyl acrylates, the alkyl groups of which have an average of 4–14 atoms, and a minor proportion of at least one copolymerizable monomer having a polar group,
b) 5–15 phr of hydrophobic silica,
c) one or more polymerization initiators and
d) one or more crosslinker compounds in a concentration resulting in a crosslink density obtainable by using hexanediol diacrylate as a reference crosslinker compound in the concentration of between 0.08–0.13 phr.

The term average of 4–14 C atoms means that the average number of C atoms of the alkyl acrylate compounds, weighed by their respective percentage by weight with respect to the mass of the alkyl acrylate component, is between 4–14 and, in particular, between 4–12 atoms.

Useful alkyl acrylates (i.e., acrylic acid alkyl ester monomers) include linear of branched monofunctional unsaturated acrylates or methacrylates of non-tertiary alkyl alcohols, the alkyl groups of which have from 4 to 14 and, in particular, from 4 to 12 carbon atoms. Examples of these lower alkyl acrylates used in the invention include, but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate. Preferred lower acrylate and methacrylate esters include isooctyl acrylate, n-butyl acrylate, 2-ethylhexyl acrylate, isononyl acrylate and dodecyl acrylate.

The precursor of the above preferred acrylate-based pressure-sensitive adhesive preferably contains up to 5 and, in particular, 1–4 alkyl acrylates. The average number of carbon atoms in the alkyl groups of the alkyl acrylates as defined above, preferably is between 4–14, especially between 4–12 and very particularly between 5–10. The concentration of the alkyl acrylate component with respect to the mass of the precursor of the pressure-sensitive adhesive preferably is at least 70 wt. %, and, in particular, at least 80 wt. %.

The precursor of the above preferred acrylate-based pressure-sensitive adhesive can contain alkyl esters of unsaturated aliphatic carboxylic acids other than acrylic acid such as, for example, alkyl maleates and alkyl fumarates (based, respectively, on maleic and fumaric acid). In this regard, dibutyl maleate, dioctyl maleate, dibutyl fumarate and dioctyl fumarate, are preferred.

The amount of ester compounds of unsaturated aliphatic carboxylic acids other than acrylic acid preferably is not too high and, in particular, does not exceed 25 wt. % with respect to the mass of the alkyl acrylate component.

The term polar monomers includes both moderately polar and strongly polar monomers. Polarity (i.e., hydrogen-bonding ability) is frequently described by the use of terms such as 'strongly', 'moderately', and 'poorly'. References describing these and other solubility terms include 'Physical and Chemical Examination of Paints, Varnishes, Lacquers, and Colors', Paint Testing Manual, 13$^{th}$ Ed., G. G. Sward, Ed.," American Society for Testing and Materials, Philadelphia, Pa., and 'A Three-Dimensional Approach to Solubility', Journal of Paint Technology, Vol. 38, No. 496, pp. 269–280. Examples for strongly polar monomers are acrylic acid, methacrylic acid and acrylamides while N-vinyl lactams such as, for example, N-vinyl pyrrolidone, N-vinyl caprolactam, acrylonitrile and dimethyl aminopropyl methacrylate are typical examples of moderately polar monomers.

It was found that the presence of polar comonomers in the precursor of the above preferred acrylate-based pressure-sensitive adhesive is essential. The polar comonomers are preferably present in an amount of between 5 and 15 phr. At least 5 phr is required to give the adhesive internal strength and to provide high levels of peel adhesion and static shear on the respective surface. Levels of polar monomer in excess of 15 phr impart a very high level of adhesion which builds to a very high level with time, rendering the adhesive largely permanently bonded to the surface. Especially preferred are precursors comprising polar comonomers in an amount of between 8–15 phr and very especially between 9–12 phr.

The above preferred acrylate-based pressure-sensitive adhesive furthermore comprises 5–15 phr hydrophobic silica. The amount of hydrophobic silica is at least 5 phr, preferably at least 10 phr. The upper limit of the amount of hydrophobic silica of about 15 phr is due to its effect of increasing toughness and decreasing compliance. The PSA materials according to the present invention preferably contain 7–15 phr and especially between 10–15 phr of hydrophobic silica.

Hydrophobic silica is commercially available, for example, from Degussa, Hanau as "Aerosil" R972, R974 or R976. According to a Degussa bulletin entitled "Product Information" of Jun. 4, 1984, the hydrophobic silicas "Aerosil" R972, R974 and R976 are prepared from hydrophilic silicas denoted as "Aerosil" 130, 200 and 300, respectively, which exhibit a surface area of 130, 200 and 300 m$^2$/g, respectively. Hydrophobic silica is furthermore commercially available, for example, as TS-720 from Cabot Cab-O-Sil Division, Tuscola, Ill. U.S.A. In U.S. Pat. No. 2,859,198 (Sears et al.) it is proposed that the surface of finely-divided inorganic solid silicon-containing materials, such as silica, can be rendered hydrophobic by treating the material with an organo-siloxane material. According to U.S. Pat. No. 4,163,081 (Schulz), silica "can be treated with by organo-silicon materials such as chlorosilanes, silazanes, alkoxysilanes and cyclic siloxanes to *produce hydrophobic surfaces" (col. 6, lns. 47–52).

The enumeration of hydrophobic silica materials given above, and the description of some selected methods for preparing hydrophobic silica materials is to be understood as illustrative and by no means limitative. The hydrophobic silica used to prepare the PSA materials according to the present invention, preferably exhibits a surface area of at least 10 m$^2$/g and especially of at least 50 m$^2$/g. The surface area of the hydrophobic silica especially preferably is between 50 to 400 m$^2$/g (B.E.T. surface area).

The precursor of the above preferred acrylate-based PSA furthermore contains a crosslinker component to increase the internal strength and toughness of the resulting PSA material. Useful crosslinkers include benzaldehyde, acetaldehyde, anthraquinone, various benzophenone-type and vinyl-halomethyl-s-triazine type compounds such as, for example, 2,4-bis(trichloromethyl)-6-p-methoxystyryl-s-triazine. Preferred are polyacrylic-functional monomers such as, for example, trimethylolpropane triacrylate, pentaerythritol tetraacrylate, 1,2-ethylene glycol diacrylate, tripropyleneglycoldiacrylate, 1,6-hexanediol diacrylate or 1,12-dodecanediol diacrylate. The compounds listed above, which can be substituted or unsubstituted, are intended to be illustrative and by no means limitative.

The crosslinking component to be used in the present invention preferably contains 1–5, especially between 1–3 and very particular 1–2 crosslinker compounds. Especially preferred crosslinker compounds are 1,6-hexanediol diacrylate and tripropyleneglycoldiacrylate.

The degree of crosslinking (crosslink density) which can be expressed as the number of cross-links per gram or per unit volume of the polymer, can be estimated theoretically and determined experimentally, for example, by swelling measurements or via stress strain curves (see Encyclopedia of Polymer Science and Engineering, 2nd. ed., New York 1988, vol.4, p. 355–357). A detailed description of swelling measurements which are preferred, is given in P.J. Flory, Principles of Polymer Chemistry, Cornell University Press, Ithaca and London, 1953, p.579. When reacting two different precursors which differ with respect to the crosslinker component but are otherwise identical, under identical external reaction conditions (polymerization method such as bulk, solution, emulsion or suspension polymerization, temperature, pressure, irradiation in case of UV-polymerization, etc.), the crosslink density obtained depends on the chemical nature of the crosslinkers used, their functionality and their respective concentration. In the present application, the crosslink density is reported with respect to the crosslink density which is obtainable by using variable amounts of hexanediol diacrylate (HDDA) as a reference crosslinker component under standardized reaction conditions (bulk photopolymerization, photoinitiator: Irgacure 651, supplied by Ciba Geigy, in a concentration of 0.24 phr; UV irradiation with an exposure of 900–1500 mJ/cm$^2$ from an UV lamp, 90% of the emissions of which are between 300 and 400 nm, with a maximum at 351 nm; room temperature; normal pressure; exclusion of oxygen).

The precursor of the above preferred acrylate-based PSA contains one or more crosslinker compounds in a concentration to give a crosslink densit obtainable by using HDDA as a reference crosslinking compound in an otherwise identical precursor under identical external conditions, in a concentration of 0.08, phr or more. It was found that for lower crosslinker concentrations, the internal strength and the removability are insufficient and do not meet all practical requirements. It was also found that the precursor of the above preferred acrylate-based PSA preferably exhibits a crosslink density obtainable by using HDDA in a concentration of not more than 0.13 phr because above this value, the cantilever resistance on smooth surfaces, such as, for example, glass or stainless steel, tends to become too low. Especially preferred is the use of the above preferred pressure-sensitive adhesives which contains 8–15 phr of at least one polar copolymerizable monomer and which exhibit a crosslink density obtainable by using HDDA in a concentration of 0.11 to 0.13 phr.

The precursor of the above preferred acrylate-based PSA preferably contains one or more crosslinker compounds in a concentration to give a crosslink density obtainable by using HDDA in a concentration between 0.08–0.13 phr and more preferably between 0.09 and 0.12 phr. The pressure-sensitive adhesive used in the present invention preferably displays an affinity for smooth rigid surfaces as defined by a 90° peel adhesion test. Preferably, the pressure sensitive adhesive has a peel adhesion value from glass of 40–80 N/2.54 cm after a dwell time of 3 days and a peel adhesion from painted metal surfaces of 20–50 N/2.54 cm after a dwell time of 3 days as measured according to the test method specified below.

The pressure-sensitive adhesive used in the present invention preferably has a static shear value measured from polypropylene of greater than 10,000 min as measured according to the test method specified below.

The PSA materials according to the present invention and, in particular the above preferred acrylate-based PSA material can be obtained by applying generally known polymerization methods such as bulk, solution, emulsion or suspension polymerization. Due to environmental reasons bulk polymerization is often preferred in order to avoid using organic solvents.

The polymerization reaction is preferably started by means of a polymerization initiator and preferably proceeds via a radical polymerization mechanism. Useful examples of polymerization initiators include photoactivatable initiators such as, for example, benzoin ethers (e.g., benzoin methyl ether, benzoin isopropyl ether, substituted benzoin ethers such as anisoin methyl ether), acetophenones (e.g., 2,2-diethoxyacetophenone) or alpha-ketols (e.g., 2-methyl-2-hydroxy-propiophenone), and/or thermally activatable initiators such as, for example, organic peroxides (e.g., benzoyl peroxide and lauryl peroxide) and 2,2'-azobis (isobutyronitrile). Photopolymerization and the addition of photoactivatable initiators are preferred. The initiator component preferably comprises between 1–3 and, in particular, between 1–2 initiator compounds; especially preferred are initiator components containing only one photoinitiator. The initiator component is preferably present in an amount of 0.01–2.00 phr, in particular, between 0.05–1.00 phr and very specifically between 0.1–0.5 phr.

In a preferred method of preparation of the preferred acrylate-based pressure-sensitive adhesive, a part of the initiator component is added to the alkyl acrylate part which is partly polymerized to a degree of typically 2–30% to form a syrup of coatable viscosity of, for example, 300–20,000 cps (Brookfield) at ordinary room temperatures. The viscosity of the syrup is preferably adjusted to the amount of hydrophobic silica to be added. For high loadings with hydrophobic silica of, for example, 15 phr, the viscosity of the syrup preferably is not more than 1,000 cps and, in particular, between 250 and 1,000 cps. For lower loadings with hydrophobic silica, the viscosity preferably is not less than 1,500 cps and, in particular, 1,750 cps or more. The viscosity of the precursor can also be adjusted by adding a small amount of typically less than 5 phr of a polymeric additive which preferably is a photopolymerizable polyacrylate as is described, for example, in WO 94/00,052. The polymerization preferably proceeds as photopolymerization which is described, for example, in U.S. Pat. No. 4,181,752. In a preferred embodiment, the polymerization is carried out with UV black lights having over 60 percent, and preferably over 75 percent of their emission spectra between 280 to 400 nm, with an intensity between about 0.1 to about 25 mW/cm². The exposure is typically between 900–1,500 mJ/cm². The polymerization may be stopped either by removal of the radiation or heat source and/or introduction of, for example, radical scavenging oxygen.

The filler part of the preferred acrylate-based precursor essentially comprising hydrophobic silica, is subsequently added to the prepolymerized syrup. When the amount of the hydrophobic silica exceeds about 8 phr, it has been found necessary to employ a high-shear mixer such as a paint mill to obtain uniform dispersions.

The dispersion obtained is mixed with the remaining part of the initiator component and, optionally, with other adjuvants such as, for example, chain transfer agents, polymer additives like, for example, those described in EP 0,349,216 or EP 0,352,901, solvents, fire retardants, pigments, colorants, odor masking agents and/or other adjuvents known in the tape art. Especially preferred is the addition of pigments, colorants and/or inks which impart color to the resulting PSA materials without adversely affecting their transparency and clarity. An example of a suitable ink is Yellow Permalink CTL-Druckfarbe (printing ink) which is obtainable from SICPA Druckfarben, Backnang.

To produce PSA layers for use in the holding device of the present invention, the above dispersion or mixture obtained is coated onto a backing, a carrier web or a release liner and polymerized in an inert, i.e. oxygen free atmosphere, for example a nitrogen atmosphere.

The layer of pressure-sensitive adhesives obtained can be supported or unsupported, and they exhibit a thickness between 30 to 20,000 $\mu$m, preferably between 100–10,000 $\mu$m, especially between 200–10,000 $\mu$m and very specifically from 400–1000 $\mu$m. Supported tapes comprising two exposed adhesive layers on opposite sides of the backing, will be termed above and below as double-coated tapes. The present invention allows the preparation of relatively thick to thick adhesive films which is due to the excellent mechanical properties of the PSA material according to the present invention. Especially preferred are unsupported films with a thickness of at least 200 $\mu$m comprising a PSA material according to the present invention.

The holding devices according to the present invention comprise a holding means can be obtained by adhering a pressure-sensitive adhesive layer to the holding means such as an injection-molded, preformed plastic hook or an anchoring device. The pressure-sensitive adhesive tape can be combined with the holding means by any of several methods. One preferred method is to first form the pressure-sensitive adhesive layer on an adhesive-repellent release liner, die-cut the sheet thus formed into small sections roughly the same size as the holding means, and finally adhere one side of the pressure-sensitive tape to the holding means.

Pressure-sensitive adhesives layers of the present invention lend themselves particularly well to die-cutting.

Because of their advantageous internal strength, the adhesive layers can be die-cut in such a manner that the edges of the resulting adhesive sections lie directly adjacent to one another. In spite of physical contact between the two adhesive masses, they do not flow together and/or bond to one another in an irreversible fashion. This behavior is particularly advantageous in that it results in considerable. reduction or avoidance of waste on "weed" commonly resulting from conventional die-cutting processes.

Alternatively, the precursor of the pressure-sensitive adhesive can be coated onto the holding means and polymerized in place.

If a double-coated tape is used, the carrier layer or. backing may be selected from a group of materials comprising polymeric films of various stiffness such as, for example, polyolefins, polyesters, polycarbonates or polymethacrylates, papers, non-wovens. The thickness of the carrier layer typically varies between 25 $\mu$m and 3,000 $\mu$m, preferably between 25 and 1,000 $\mu$m. The carrier material should be selected such that both layers of the adhesive bond very strongly to it. Such a choice can be made easily and does not require any inventive input from the expert. If desired, the carrier material may be treated with chemical primers or may be corona treated. The respective adhesive masses can be laminated onto the carrier sheet by means of transfer tapes in the form of cured adhesive films, but it is also possible to coat the precursors of the respective adhesive layers onto the carrier layer with subsequent, for example, photochernical curing.

The exposed pressure-sensitive adhesive layer is typically protected by one or more release liners. Suitable release liners are, for example, siliconized papers, siliconized polyesters, polyethylenes or polymer films treated with fluorochemicals.

The present invention also refers to a kit of parts comprising a) a holding means, b) a pressure-sensitive adhesive layer to be attached to the holding device, and optionally c) a lever tool.

The lever tool can be of any number of designs, but essentially is any rigid tool which can be inserted between the holding device of the present invention and the rigid surface to which it is attached and used to pry the two apart. A flat-headed screwdriver can be used as a suitable lever tool, for example. Special lever tools designed for this purpose can be provided as well, for example, those with a flattened end for insertion between the holding device and the mounting surface. The flattened end may be bent at an angle with respect to the handle of the tool so that leverage may be applied more easily.

Test Methods

1. Static shear

This test is based on PSTC Method PSTC-7 (Procedure A), an industry standard available from the Pressure Sensitive Tape Council of Glenview, Ill. U.S.A. All measurements of this type were made at room temperature. The pressure-sensitive adhesive was protected prior to testing by two layers of silconized biaxially-oriented polyethylene terephthalate (PET) film.

One layer of PET was removed and replaced by a 140 $\mu$m thick layer of anodized aluminum sheet. The second layer of PET was then removed, yielding a pressure-sensitive adhesive tape with an aluminum backing which was used in the static shear test. All shear measurements were made using samples of 1.27 cm×2.54 cm. The adhesive layer tested had a thickness of 800 $\mu$m. Shear measurements were performed on glass, stainless steel, polypropylene and metal coated with a polyurethane-based paint.

For stainless steel substrates, a 1.27 cm wide strip of the pressure-sensitive adhesive tape prepared by the method just described was adhered to a flat, rigid, stainless steel plate with an exactly 2.54 cm length of tape in contact with the panel. The total bonded area was then 1.27 cm×2.54 cm. Before testing, a 1,000 g weight rested over the bonded area for 15 minutes (which deviates from the PSTC method where a rubber-coated roller was used to bond the samples to the panel). Then the panel with the adhered tape test sample was placed in a special stand tilted at two degrees from vertical for 10 minutes. Then a weight of 1 kg was hung from the free end of the tape. The time required for the weight to fall was recorded as the Static Shear Value in minutes. If no failure occurred in 10,000 minutes, the test was discontinued.

The shear adhesion test to polypropylene was performed as above with the exception that a 4 mm thick sheet of polypropylene having a polished surface was used instead of a stainless steel plate.

The shear adhesion test to painted metal was performed exactly as the test to stainless steel, with the exception that a substrate was employed which is representative of a painted automobile body. A metal plate painted with a two-component polyurethane lacquer was employed.

2. 90° Peel Adhesion

A modified version of PSTC Method PSTC-3 which is available from the Pressure Sensitive Tape Council of Glenview, Ill. U.S.A., was used. The present test deviated from the PSTC Method in that an anodized aluminum film was substituted for the polymeric film backing normally used for this test. All peel adhesion measurements are given in N/1.27 cm.

Prior to testing, the pressure-sensitive adhesive layer was protected between two layers of siliconized biaxially-oriented polyethylene terephthalate (PET) film. This laminate was cut to a width of 1.27 cm. After removal of one layer of PET, the pressure-sensitive adhesive was adhered to a rigid substrate. The second layer of PET was removed and a 1.60 cm wide, 140 $\mu$m thick anodized aluminum strip was adhered to the adhesive under a weight of 6.8 kg hard rubber-covered steel roller with 1 pass in each direction. The values of the examples were each determined from three measurements.

For the adhesion measurements, glass, stainless steel, polypropylene and sheet metal painted with a polyurethane-based paint were used as substrates. The values of 900 peel adhesion was measured after 20 minutes and 3 days dwell time, respectively, at room temperature by moving the free end of the aluminum strip away from the respective substrate at 90° and at rate of 305 mm per minute using a tensile tester.

3. Compliance

Samples of pressure-sensitive adhesive having a thickness range of 0.067 to 0.112 mm were stored under constant temperature of 23° C. and a relative humidity of 50% as described in ASTM D1151–90 for at least 24 hr before testing.

Two thin films of adhesive were prepared by die-cutting samples of equal areas to use as test pieces. The two test pieces were placed in the parallel plate creep compliance rheometer, one piece being attached adhesively on each side of the center plate, with an outer plate contacting a liner-covered surface of each adhesive sample. Screws which connect the two outer plates were then tightened so as to compress the interposed layers of adhesive approximately 10%. The parallel plates were placed in horizontal arrangement and one end of the center plate was connected to a linear variable transducer which measured the plate displacement (due to adhesive flow) and output an electrical signal, proportional to the displacement, to a chart recorder.

A hook was attached to the opposite end of the center plate with a flexible wire extending horizontally from the hook and then downward over a pulley, the outer plates being held in a fixed position. A suitable weight (one which is sufficient to measurably deform the sample a distance no greater than its thickness) was attached to the free end of the wire, then the strip chart recorder was started. The weight used to exert the stress on the adhesive films of this invention was 0.5 lb. From the strip chart recorder, the time and the displacement (strain) were read and the applied force (stress) was recorded.

The creep compliance at a given temperature is then calculated using the equation:

$$J_{(t)} = \frac{2A\,X}{hf}$$

where t is the time at which the measurement is taken, A is the area of one face of the adhesive samples, h is the thickness of the adhesive mass, X is the displacement at time t (where X is less than h) and f is the force due to the mass attached to the wire connected to the middle plate.

Where A is expressed in $m^2$ ($cm^2$), h in m (cm), X in m (cm), and f in N (dynes), then the compliance value $J_{(t)}$ is given in $m^2/N$ ($cm^2/dyne$).

All measurements were made after a time (t) of 500 sec.

4. Toughness

Toughness is defined as the area under the stress-strain curve which is obtained by measuring the tensile strength according to a modified ASTM Method D412–92. An Instrom™ tensile tester was used which met the apparatus requirements according to section 6.1 of ASTM Designation D 412–92.

The test method applied is denoted in ASTM Designation D 412–92 as "Test Method B - Cut Ring Specimens" and Type 1 ring specimens as defined in section 10.1 of said ASTM Designation are used.

The present method deviated from ASTM Method D412–92 in that

- a crosshead rate of 4 in/min±1.016 cm (0.4 in)/min was used instead of 50.8±5.08 cm (20±2 in) /min
- a ring thickness of 0.067564 to 0.11176 cm (0.0266 to 0.044 inches) was used instead of 0.1016 to 0.254 cm (0.040 to 0.130 inches)
- toughness is measured as the area under the stress-strain curve at an elongation of 900% in $kg/m^2$ (pounds/$inch^2$).

EXAMPLES

Examples 1–4

A mixture of 0.04 pph of Irgacure 651 (commercially available from Ciba-Geigy), 90 parts by weight of isooctylacrylate (IOA) and 10 parts acrylic acid (AA) was partially polymerized by UV light to form a syrup of a coatable viscosity of about 2,000 mPas. Then as indicated in Table 1, various amounts of hydrophobic silica, 1,6-hexanediol diacrylate (HDDA) and, in each case, 0.2 phr of Irgacure 651 (commercially available from Ciba-Geigy) were added to the syrup followed by mixing with a mechanical stirrer for 90 minutes.

The coating and curing of the syrup were performed between two transparent siliconized polyester films. The level of radiation dosage used to complete the adhesive polymerization was about 1,300 $mJ/cm^2$, the radiation being supplied from lamps having about 90% of the emissions between 300 and 400 nm, and a peak emission at 351 nm. The thickness of the adhesive samples was chosen to be about 800 µm.

The pressure-sensitive adhesive layer of Examples 1–4 were subjected to 90° peel adhesion, static shear, toughness and compliance tests. The results are summarized in Table 2.

Comparative Examples 1–3

A pressure-sensitive adhesive layer was prepared as described in Example 1, with the exception that the HDDA concentration was 0.06 phr and 0.15 phr, respectively. These were labelled Comparative Examples 1 and 2, respectively. Comparative Example 3 was prepared in a manner identical with that of Example 1, with the exception that no hydrophobic fumed silica was employed. The pressure-sensitive adhesive layers of Comparative Examples 1–3, respectively, were subjected to 90° peel adhesion, static shear, toughness and compliance tests. The results are summarized in Table 2.

TABLE 1

| Examples | IOA, phr | AA, phr | Fumed silica, phr | HDDA, phr |
|---|---|---|---|---|
| 1 | 90 | 10 | 15 | 0.08 |
| 2 | 90 | 10 | 15 | 0.10 |
| 3 | 90 | 10 | 15 | 0.12 |
| 4 | 90 | 10 | 10 | 0.12 |
| C1 | 90 | 10 | 15 | 0.06 |
| C2 | 90 | 10 | 15 | 0.15 |
| C3 | 90 | 10 | — | 0.12 |

TABLE 2

| | 90° Peel [N/2.54 cm] | | | | | | Static shear [min] | | | | Toughness [kg/$m^2$ (pounds/$in^2$)] | Compliance [$m^2/N$ ($cm^2/dyne$)] |
|---|---|---|---|---|---|---|---|---|---|---|---|---|
| Ex. | Glass 20 min | Glass 3 day | Steel 20 min | Steel 3 day | Painted metal 20 min | Paint. metal 3 day | Glass | PP | Steel | Painted. metal | | |
| 1 | 50.5 | 77.9 | 36.0 | 62.8 | 9.8 | 25.0 | >10,000 | 8,979 | >10,000 | >10,000 | 3.30 × 10³ (6.75 × 10²) | 1.46 × 10⁻⁵ (1.46 × 10⁻⁶) |
| 2 | 25.0 | 65.3 | 29.0 | 47.9 | 12.8 | 27.4 | >10,000 | >10,000 | >10,000 | >10,000 | 3.16 × 10³ (6.48 × 10²) | 1.23 × 10⁻⁵ (1.23 × 10⁻⁶) |
| 3 | 40.3 | 47.1 | 22.8 | 57.3 | 7.1 | 38.9 | >10,000 | >10,000 | >10,000 | >10,000 | 4.45 × 10³ (9.11 × 10²) | 1.13 × 10⁻⁵ (1.13 × 10⁻⁶) |

TABLE 2-continued

| | 90° Peel [N/2.54 cm] | | | | | | Static shear [min] | | | | Toughness [kg/ m² (pounds/in²)] | Compliance [m²/N (cm²/dyne)] |
|---|---|---|---|---|---|---|---|---|---|---|---|---|
| Ex. | Glass 20 min | Glass 3 day | Steel 20 min | Steel 3 day | Painted metal 20 min | Paint. metal 3 day | Glass | PP | Steel | Painted. metal | | |
| 4 | 37.5 | 51.0 | 28.2 | 57.4 | 12.6 | 23.5 | >10,000 | >10,000 | >10,000 | >10,000 | — | — |
| C1 | 46.8 | 73.2 | 43.0 | 72.9 | 11.7 | 29.6 | >10,000 | >10,000 | >10,000 | >10,000 | $4.45 \times 10^3$ ($9.11 \times 10^2$) | $2.65 \times 10^{-5}$ ($2.65 \times 10^{-6}$) |
| C2 | — | 40.5 | 17.7 | 51.7 | 6.6 | 8.6 | >10,000 | >3,889 | >10,000 | >10,000 | — | — |
| C3 | 36.7 | 38.1 | 26.0 | 36.8 | 21.0 | 22.80 | 8,840 | 2,331 | 9,602 | >10,000 | $9.03 \times 10^2$ ($1.85 \times 10^2$) | $4.64 \times 10{-5}$ ($4.64 \times 10^{-6}$) |

What is claimed is:

1. Holding device that is attachable to a rigid surface comprising in exposed pressure-sensitive adhesive layer wherein the pressure sensitive adhesive is a polymerized precursor wherein the precursor comprises:
   (a) a monomirl component that contains one or more alkyl acrylates, the alkyl groups of which have an average of 4–14 C atoms, and a minor proportion of at least one copolymerizable monomer having a polar group,
   (b) 5–15 phr of hydrophobic silica,
   (c) one or more polymerization initiators, and
   (d) one or more crosslinker compounds in a concentration resulting in a crosslink density using hexanediol diacrylate as a reference crosslinker compound in the concentration of between 0.08–0.13 phr,
   such that the pressure sensitive is readily removable from the surface and exhibits a compliance of between $5 \times 10^{-7}$ to $2 \times 10^{-6}$ cm²/dyne, and a toughness of between $6 \times 10^2$ to $2 \times 10^3$ pounds/inch².

2. Holding device according to claim 1, wherein the holding means is a hook.

3. Holding device according to claim 1, wherein the alkyl acrylates are selected from a group consisting of n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate.

4. Holding device according to claim 1, wherein the copolymerizable monomer has a strongly polar group selected from the group consisting of acrylic acid, methacrylic acid and acrylamide and substituted acrylamides.

5. Holding device according to claim 1, wherein the precursor comprises between 10–15 phr of hydrophobic silica.

6. Holding device according to claim 1, wherein the surface area of the hydrophobic silica is at least 10 m²/g.

7. Holding device according to claim 1 containing one or more crosslinkers in a concentration to provide a crosslink density using hexanediol diacrylate in a concentration of 0.09–0.12 phr.

8. Holding device according to claim 1, wherein the crosslinking agents are selected from a group consisting of trimethylolpropane triacrylate, pentaerythritol tetraacrylate, 1,2-ethylene glycol diacrylate, tripropyleneglycol diacrylate, 1,6-hexanediol diacrylate and 1,12-dodecanediol diacrylate.

9. Holding device according to claim 1 wherein the adhesive tape is a single layer of said pressure-sensitive adhesive.

10. Holding device according to claim 1 wherein the adhesive tape is a double-coated tape comprising at least one exposed layer of said pressure-sensitive adhesive.

11. Holding device according to claim 1 wherein the adhesive tape is a double-coated tape comprising an exposed adhesive layer for permanent bonding to the holding means.

* * * * *

UNITED STATES PATENT AND TRADEMARK OFFICE
CERTIFICATE OF CORRECTION

PATENT NO. : 6,458,454 B1
DATED : October 1, 2002
INVENTOR(S) : Kreckel, Karl W.

It is certified that error appears in the above-identified patent and that said Letters Patent is hereby corrected as shown below:

Column 1,
Line 54, delete "aikyl" and insert -- alkyl --, therefore.
Line 66, delete "$2.9 \text{x-} 10^3$" and insert -- adhesive --, therefore.

Column 3,
Line 36, delete "be hive" and insert -- adhesive --, therefore.

Column 4,
Line 3, delete "$5 \text{x} 10^7$" and insert -- $5 \text{x} 10^{-7}$ --, therefore.
Line 14, delete "$7.5 \text{x} 10^{31\ 6}$" and insert -- $7.5 \text{x} 10^{-6}$ --, therefore.
Line 15, delete "$7.5 \text{x} 10^{31\ 7}$" and insert -- $7.5 \text{x} 10^{-7}$ --, therefore.
Line 15, delete "$1.5 \text{x} 10^{31\ 6}$" and insert -- $1.5 \text{x} 10^{-6}$ --, therefore.
Line 19, after "$2.9 \text{x} 10^3$ and." insert -- $4.9 \text{x} 10^3$ --.

Column 5,
Line 24, delete "Physical and Chemical Examination of Paints, Varnishes, Lacquers, and Colors" and insert -- Solvents --, therefore.
Line 26, delete "$13^{th}$" and insert -- $3^{rd}$ --, therefore.
Line 26, delete "Sward" and insert -- Seward --, therefore.
Line 27, delete "Ed.," American" and insert -- Ed., American --, therefore.

Column 6,
Line 66, delete "densit" and insert -- density --, therefore.

Column 7,
Line 20, delete "The pressure-sensitive" and insert -- The pressure-sensitive -- on line 21 as a new paragraph.

Column 8,
Line 55, after "means" insert -- that --.

Column 9,
Line 7, delete "considerable. reduction" and insert -- consideration reduction --, therefore.
Line 29, delete "photochernical" and insert -- photochemical --, therefore.

UNITED STATES PATENT AND TRADEMARK OFFICE
CERTIFICATE OF CORRECTION

PATENT NO. : 6,458,454 B1
DATED : October 1, 2002
INVENTOR(S) : Kreckel, Karl W.

It is certified that error appears in the above-identified patent and that said Letters Patent is hereby corrected as shown below:

<u>Column 13,</u>
Line 9, Table 2, delete "4.64x10-5" and insert -- $4.64 \times 10^{-5}$ --, therefore.
Line 17, delete "in" and insert -- an --, therefore.
Line 21, delete "monomirl" and insert -- monomer --, therefore.
Line 23, delete "ieast" and insert -- least --, therefore.

Signed and Sealed this

Ninth Day of November, 2004

JON W. DUDAS
*Director of the United States Patent and Trademark Office*